US010988933B2

(12) United States Patent
Reynolds et al.

(10) Patent No.: US 10,988,933 B2
(45) Date of Patent: Apr. 27, 2021

(54) FLASHING ASSEMBLIES PREPARED WITH LIQUID FLASHING COMPOSITIONS

(71) Applicant: Firestone Building Products Company, LLC, Nashville, TN (US)

(72) Inventors: Matthew J. Reynolds, Goodlettsville, TN (US); Michael J. Hubbard, Murfreesboro, TN (US)

(73) Assignee: Firestone Building Products Company, LLC, Nashville, TN (US)

( * ) Notice: Subject to any disclaimer, the term of this patent is extended or adjusted under 35 U.S.C. 154(b) by 0 days.

(21) Appl. No.: 16/388,135

(22) Filed: Apr. 18, 2019

(65) Prior Publication Data

US 2019/0330854 A1 Oct. 31, 2019

Related U.S. Application Data

(60) Provisional application No. 62/662,441, filed on Apr. 25, 2018.

(51) Int. Cl.
| | | |
|---|---|---|
| *E04D 13/14* | (2006.01) | |
| *B32B 27/12* | (2006.01) | |
| *E04D 11/02* | (2006.01) | |

(52) U.S. Cl.
CPC .......... *E04D 13/1407* (2013.01); *B32B 27/12* (2013.01); *E04D 11/02* (2013.01); *B32B 2419/06* (2013.01)

(58) Field of Classification Search
CPC . E04D 13/1407; E04D 13/1476; E04D 11/02; B32B 2419/06; B32B 2307/712; B32B 27/12; B32B 5/022

USPC .................................. 52/58, 220.8, 302.6
See application file for complete search history.

(56) References Cited

U.S. PATENT DOCUMENTS

| | | | | | |
|---|---|---|---|---|---|
| 1,931,066 | A | * | 10/1933 | Eckert ..................... | E04D 13/17 52/302.1 |
| 4,730,421 | A | * | 3/1988 | Leeland .............. | E04D 13/1407 285/42 |
| 4,870,796 | A | * | 10/1989 | Hart .......................... | E04D 7/00 52/409 |
| 4,932,171 | A | * | 6/1990 | Beattie ................ | E04D 13/1415 52/273 |

(Continued)

OTHER PUBLICATIONS

Kirk Goodrum, The PMMA Revolution,Interface, Nov. 2016,pp. 12-15.

(Continued)

*Primary Examiner* — Brent W Herring

(57) ABSTRACT

One or more embodiments of the present invention provide A roofing system comprising (i) a roof deck; (ii) a vertical structure extending from said roof deck; (iii) a membrane system covering said roof deck; and (iv) a flashing assembly creating a water-proof seal between said membrane system and said vertical structure, where said flashing assembly includes a flashing composite having a polymeric membrane component and a fabric component, said polymeric membrane component being bonded to said membrane system, and said flashing assembly further including a cured residue layer of a liquid flashing composition extending from said fabric component of said fleeced flashing membrane to a surface of said vertical structure, and said cured residue being bonded to said fabric component and said surface of said vertical structure.

11 Claims, 2 Drawing Sheets

(56) References Cited

U.S. PATENT DOCUMENTS

| | | | | |
|---|---|---|---|---|
| 5,736,472 A * | 4/1998 | Mahn, Jr. | ............ | B29C 37/0082 |
| | | | | 442/293 |
| 5,802,787 A * | 9/1998 | Thaler | ................. | E04D 13/1407 |
| | | | | 285/42 |
| 5,833,788 A * | 11/1998 | Mahn, Jr. | ............ | B29C 37/0082 |
| | | | | 156/209 |
| 6,185,885 B1 * | 2/2001 | Thaler | ................. | E04D 13/1407 |
| | | | | 285/42 |
| 6,725,610 B2 * | 4/2004 | Murphy | ................... | E06B 1/62 |
| | | | | 52/58 |
| 7,776,177 B2 * | 8/2010 | Hubbard | ................. | B29C 63/02 |
| | | | | 156/300 |
| 9,752,054 B2 | 9/2017 | Byrne et al. | | |
| 2001/0034984 A1 * | 11/2001 | Murphy | ................... | E06B 1/62 |
| | | | | 52/204.5 |
| 2004/0157074 A1 * | 8/2004 | Hubbard | ................. | B29C 63/02 |
| | | | | 428/515 |
| 2005/0150176 A1 * | 7/2005 | Erekson | ............. | E04D 13/1476 |
| | | | | 52/58 |
| 2007/0187017 A1 * | 8/2007 | Hubbard | ................. | B29C 63/02 |
| | | | | 156/60 |
| 2008/0302032 A1 * | 12/2008 | Valentz | ................... | E04D 13/03 |
| | | | | 52/200 |
| 2009/0255201 A1 * | 10/2009 | Kraus, Jr. | ............... | E04D 5/144 |
| | | | | 52/309.5 |
| 2012/0204508 A1 * | 8/2012 | Kalwara | ............ | E04D 13/1407 |
| | | | | 52/309.3 |

OTHER PUBLICATIONS

Icopal Ltd., Types of Liquid Applied Systems, Apr. 20, 2018, pp. 1-2.

\* cited by examiner

FLASHING ASSEMBLIES PREPARED WITH LIQUID FLASHING COMPOSITIONS

This application claims the benefit of U.S. Provisional Application Ser. No. 62/662,441 filed on Apr. 25, 2018, which is incorporated herein by reference.

FIELD OF THE INVENTION

Embodiments of the present invention are directed toward flashing assemblies prepared by employing liquid flashing compositions. Embodiments also include methods for preparing flashing assemblies using liquid flashing compositions.

BACKGROUND OF THE INVENTION

In the roofing art, it is common to use membranes to provide a waterproof seal to a roof surface of a flat or low-sloped roof. Typical membrane systems include asphalt-based systems, such as those that employ modified asphalt membranes, as well as polymeric systems that employ EPDM or thermoplastic olefin (TPO) membranes.

In constructing membrane-based roofing systems, the membrane can be secured to the roof surface by employing ballasting, mechanical fastening, or adhesives. In addition to securing the membrane to the roof surface, adjacent membranes are bonded to each other to form a water-tight seal between membranes. Flashing systems or assemblies are employed to create a water-tight seal between the membrane system and any vertical structural elements on the roof including, but not limited to, parapet walls, gutter edges, and various protrusions such as pipes that penetrate the roof surface.

In the construction of modified asphalt membrane systems, it is common to employ liquid flashing compositions to create a seal with vertical surfaces such a parapet walls, pipes, and other protrusions. These liquid flashing compositions often include polyurethane compositions or polymethyl methacrylate (PMMA) compositions. The liquids can be used in conjunction with a fabric reinforcement, which can be mated to the vertical surface in conjunction with the liquid composition to ultimately form, upon drying or curing or the liquid composition, a flashing assembly.

On the other hand, when polymeric membranes are employed to construct a roof system, the flashing assemblies are typically prepared using flashing membranes, which may also be referred to as membrane flashings. For example, in the case of plastic membranes, plastic flashings are often welded to the membrane system while being adhesively secured to the non-membrane vertical surfaces, such a parapet walls and pipes. Where rubber membranes are employed, it is common to employ flashing membranes that include uncured rubber, which can be adhesively mated to the rubber membrane and adhesively mated to the vertical non-membrane surfaces.

SUMMARY OF THE INVENTION

One or more embodiments of the present invention provide a roofing system comprising (i) a roof deck; (ii) a vertical structure extending from said roof deck; (iii) a membrane system covering said roof deck; and (iv) a flashing assembly creating a water-proof seal between said membrane system and said vertical structure, where said flashing assembly includes a flashing composite having a polymeric membrane component and a fabric component, said polymeric membrane component being bonded to said membrane system, and said flashing assembly further including a cured residue layer of a liquid flashing composition extending from said fabric component of said fleeced flashing membrane to a surface of said vertical structure, and said cured residue being bonded to said fabric component and said surface of said vertical structure.

Yet other embodiments of the present invention provide a method for creating a water-proof seal between a polymeric roofing membrane and a vertical structure extending from a roof surface to which the roofing membrane is secured, the method comprising (i) providing a flashing composite that includes a polymeric membrane component and a fabric component; (ii) bonding the polymeric membrane component of the fleeced flashing membrane to the polymeric roofing membrane; and (iii) applying a liquid flashing composition to at least a portion of said fabric component of said flashing composite and to at least a portion of a surface of the vertical structure.

DETAILED DESCRIPTION OF ILLUSTRATIVE EMBODIMENTS

Embodiments of the invention are based, at least in part, on the discovery of a flashing assembly for polymeric roofing systems where the flashing assembly is prepared using a liquid flashing composition in conjunction with a fleece-backed flashing membrane. In particular, the fleece-backed flashing membrane, which includes a fleeced surface and a membrane surface, is bonded to the membrane system through the membrane surface and the liquid flashing composition via the fleeced surface. While the use of liquid flashing compositions has been advantageously used in modified asphalt membrane systems, conventional liquid flashings form an inferior bond or seal with the polymeric panels of the membrane system. The present invention therefore overcomes this issue by providing a fleeced surface to which the liquid flashing composition can be bonded while at the same time providing a bond to the polymeric membrane system through the membrane surface of the fleece-backed flashing membrane.

Flashing Assembly

Figure 1:
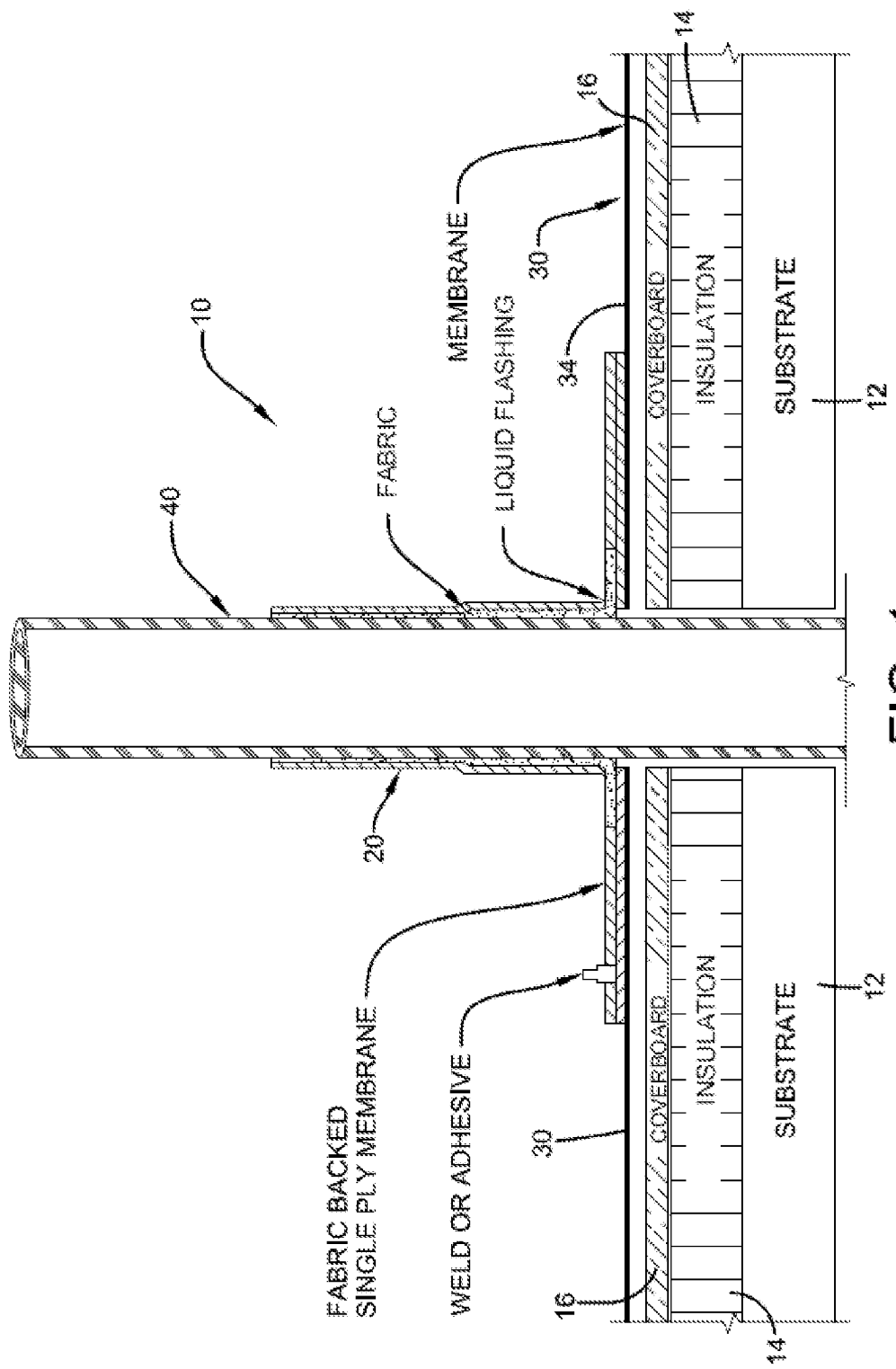
FIG. 1 is a cross-sectional side view of a roofing system including a flashing assembly according to embodiments of the present invention.

Aspects of the present invention can be understood with reference to FIG. 1, which shows roof system 10 including a completed flashing assembly 20, which creates a water-proof seal between polymeric membrane system 30 and protrusion 40. Roof system 10 may include conventional subcomponents such as, but not limited to, roof substrate 12, which may also be referred to as roof deck 12, optional insulation layer 14, which may be disposed above deck 12, and optional coverboard 16, which may be disposed above insulation layer 14. Membrane system 30, which includes one or more membrane panels, is disposed above roof deck 12, typically above insulation layer 14 and coverboard layer 16, to thereby form an exposed surface 34 of roof system 10. The skilled person will appreciate that various configurations, particularly with respect to the insulation layer and coverboard layer, can exist, especially between new roof constructions and re-roofed assemblies.

Figure 2:
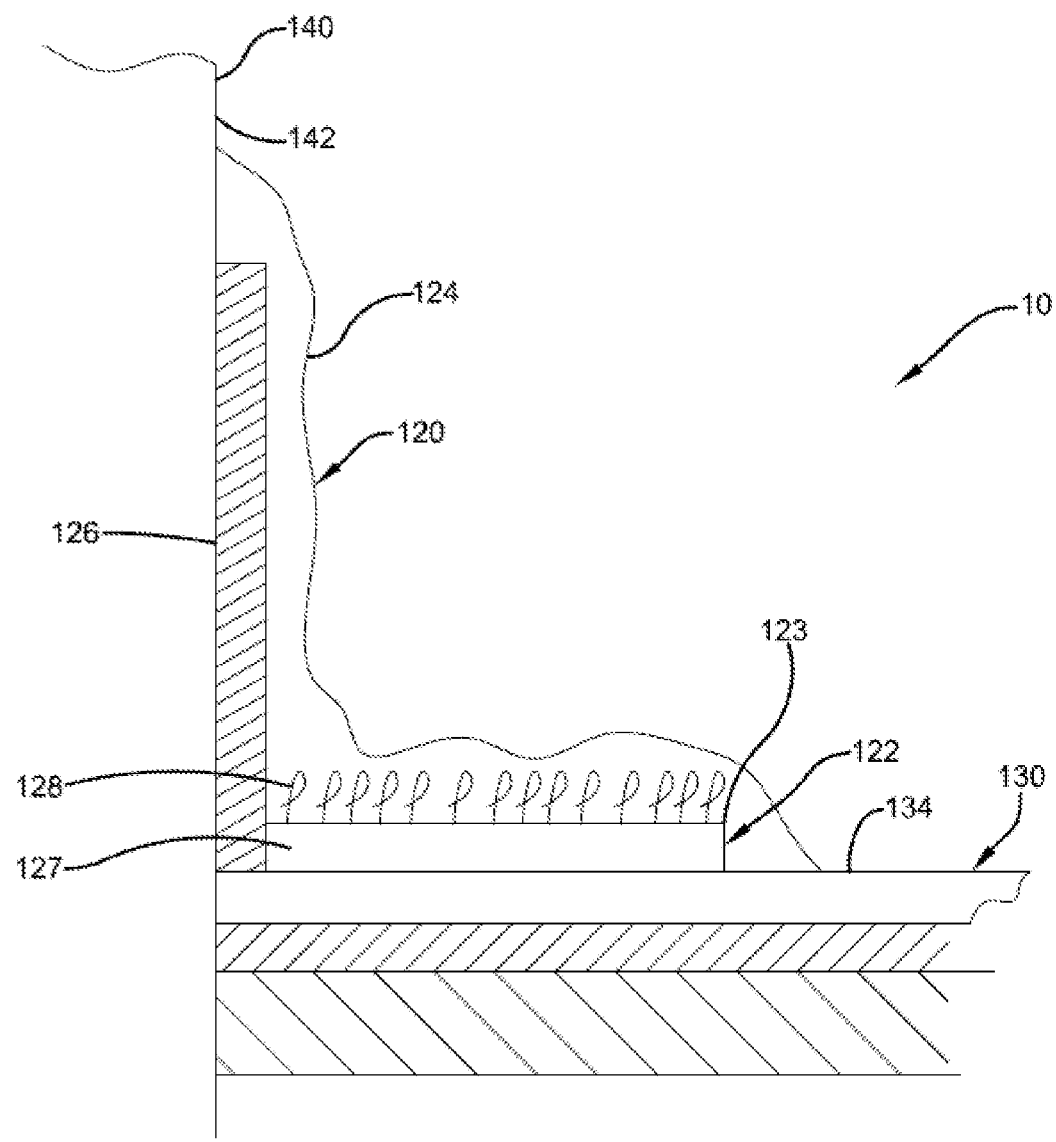
FIG. 2 is a cross-sectional view of a flashing assembly according to embodiments of the present invention.

The flashing assembly can be described with reference to FIG. 2, which shows flashing assembly 120 including fleeced flashing membrane 122, cured liquid flashing composition 124, and optional flashing fabric 126. Consistent with FIG. 1, flashing assembly 120 of FIG. 2 creates a waterproof seal between membrane system 130 and vertical, non-membrane surface 140.

Fleeced flashing membrane 122 includes a membrane component 127 and a fabric component 128, which is bonded to membrane component 127. The cured residue 124 of a liquid flashing composition is adhesively mated to at least a portion of fabric component 128. As shown in FIG. 2, the cured residue 124 extends beyond the edge 123 of fleeced flashing membrane 122 and contacts upper surface 134 of membrane system 130. In other embodiments, which are not shown, cured residue 124 of liquid flashing may only partially mate to fabric component 128 and therefore does not extend to upper surface 134 of membrane system 130.

Cured residue 124 of liquid adhesive extends from fabric component 128 of fleeced flashing membrane 122 to a contact surface 142 of vertical non-membrane surface 140. In those embodiments where flashing assembly 120 includes fabric 126, cured residue 124 mates with fabric 126 along a vertical surface thereof. In one or more embodiments, cured residue 124 extends beyond fabric 126 to mate directly to surface 142 of vertical structure 140. As shown in FIG. 2, fabric 126 is disposed adjacent to surface 142 of vertical structure 140. In other embodiments, cured residue 124 of liquid flashing may be disposed between surface 142 of vertical structure 140 and fabric 126 to thereby provide an interfacial adhesive layer between fabric 126 and surface 142.

Fleeced Flashing Membrane

As indicated above, the fleeced flashing membrane, which may also be referred to as a fleece-backed flashing membrane, or may be referred to as a flashing composite, includes a membrane component and a fabric component. The skilled person appreciates that fleece-backed membranes (e.g. fleece-backed EPDM and TPO membranes or flashings) are known in the art, and these known composites are useful in the practice of the present invention.

The skilled person will appreciate that a variety of fabrics may be used as the fabric component of the fleeced flashing membrane. In one or more embodiments, fabric is a synthetic fabric including glass or polymeric fibers or filaments. In particular embodiments, the fabric is a fleece, such as a napped fleece. Fleece backings of the type that are useful as fabric backings for roofing membranes and/or flashings are generally known in the art as described in U.S. Pat. Nos. 4,996,812, 5,422,179, 5,981,030, and 6,502,360, which are incorporated herein by reference. In particular embodiments, the fabric is fleece prepared from polyester filaments such as those prepared from polyethylene terephthalate. In one or more embodiments, the fabric is a continuous filament polyester, needle punched, nonwoven fabric. In other embodiments, the fabric is a scrim reinforced nonwoven polyester mat. In yet other embodiments, the fabric is a glass fiber mat. In still other embodiments, the fabric is a polyolefin fabric, including nonwoven polypropylene or polyethylene mats.

In one or more embodiments, where the fabric is a glass fiber mat, the fabric may be characterized by a basis weight of at least 50, in other embodiments at least 60, and in other embodiments at least 70 $g/m^2$. In these or other embodiments, the glass fiber mat may be characterized by a basis weight of at most 150, in other embodiments at most 130, and in other embodiments at most 100 $g/m^2$. In one or more embodiments, the glass fiber mat may be characterized by a basis weight of from about 50 to about 150 $g/m^2$, in other embodiments from about 60 to about 130 $g/m^2$, and in other embodiments from about 70 to about 110 $g/m^2$.

In one or more embodiments, where the fabric is a glass fiber mat, the glass mat may be characterized by a thickness of at least 0.5 mm, in other embodiments at least 0.7 mm, and in other embodiments at least 1.0 mm. In these or other embodiments, the glass mat may be characterized by a thickness of at most 2.0 mm, in other embodiments at most 1.5 mm, and in other embodiments at most 1.2 mm. In one or more embodiments, the glass mat may be characterized by a thickness of from about 0.5 to about 2.0 mm, in other embodiments from about 0.7 to about 1.5 mm, and in other embodiments from about 1.0 to about 1.2 mm.

In one or more embodiments, where the fabric is a polyester fleece, the fabric may be characterized by a basis weight of at least 70, in other embodiments at least 85, and in other embodiments at least 100 $g/m^2$. In these or other embodiments, the polyester fleece may be characterized by a basis weight of at most 400, in other embodiments at most 300, and in other embodiments at most 280 $g/m^2$. In one or more embodiments, the polyester fleece may be characterized by a basis weight of from about 70 to about 400 $g/m^2$, in other embodiments from about 85 to about 300 $g/m^2$, and in other embodiments from about 100 to about 280 $g/m^2$.

In one or more embodiments, where the fabric is a polyester fleece, the glass mat may be characterized by a thickness of at least 0.3 mm, in other embodiments at least 0.7 mm, and in other embodiments at least 1.0 mm. In these or other embodiments, the polyester fleece may be characterized by a thickness of at most 4.0 mm, in other embodiments at most 2.0 mm, and in other embodiments at most 1.5 mm. In one or more embodiments, the polyester fleece may be characterized by a thickness of from about 0.3 to about 4.0 mm, in other embodiments from about 0.7 to about 2.0 mm, and in other embodiments from about 1.0 to about 1.5 mm.

In one or more embodiments, where the fabric is a polyolefin mat, the fabric may be characterized by a basis weight of at least 35, in other embodiments at least 42, and in other embodiments at least 50 $g/m^2$. In these or other embodiments, the polyolefin mat may be characterized by a basis weight of at most 400, in other embodiments at most 300, and in other embodiments at most 280 $g/m^2$. In one or more embodiments, the polyolefin mat may be characterized by a basis weight of from about 35 to about 400 $g/m^2$, in other embodiments from about 42 to about 300 $g/m^2$, and in other embodiments from about 50 to about 280 $g/m^2$.

In one or more embodiments, where the fabric is a polyolefin mat, the glass mat may be characterized by a thickness of at least 0.3 mm, in other embodiments at least 0.7 mm, and in other embodiments at least 1.0 mm. In these or other embodiments, the polyolefin mat may be characterized by a thickness of at most 4.0 mm, in other embodiments at most 2.0 mm, and in other embodiments at most 1.5 mm. In one or more embodiments, the polyolefin mat may be characterized by a thickness of from about 0.3 to about 4.0 mm, in other embodiments from about 0.7 to about 2.0 mm, and in other embodiments from about 1.0 to about 1.5 mm.

In one or more embodiments, the membrane component of the flashing composite may include those membrane materials that have been conventionally used in the roofing art. These materials may be referred to as polymeric membranes or polymeric panels. Useful polymeric membranes include both thermoplastic and thermoset materials, as well as uncured materials, such as uncured rubber, that is capable of becoming thermoset or cured. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700,538, 5,703,154, 5,804,661, 5,854,327, 5,093,206, and 5,468,550, which are incorporated herein by reference. Other useful polymeric membranes include those made from various thermoplastic polymers or polymer composites. For example, thermoplastic olefin (i.e. TPO), thermoplastic vulcanizate (i.e. TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Practice of one or more embodiments of the invention is not limited by the manner in which the fabric component is attached to the membrane component. In one or more embodiments, the fabric component and the membrane component are bonded to each other through an adhesive. In other embodiments, the fabric component and the membrane component are mechanically bonded to each other, such as by way of heat welding, which can advantageously be employed when the membrane is a thermoplastic material. In one or more embodiments, the fabric component is secured to the membrane by heat lamination; in other words, the membrane and fabric are mated while the membrane has a degree of tack resulting from heating the membrane (e.g. thermoplastic). In other embodiments, the fabric is secured to the membrane by way of an adhesive; for example a solvent-based or hot melt hydrocarbon polymer such as SBS or SBR may be used, or in other embodiments through a pressure-sensitive adhesive. In yet other embodiments, the fabric is secured to the membrane through the use of a tie layer, which may include a thin film of adhesive material or hot melt material. In one or more embodiments, the mode of attachment is sufficient to create a bond between the fabric and the membrane such that during handling, installation, and use, the fabric maintains adherence to the membrane under conventional conditions.

Liquid Flashing Composition

As used herein, the term liquid flashing composition refers to a flowable composition that can be applied to a substrate (e.g. the flashing composites of the present invention and the vertical surfaces being flashed) to form an uncured or partially cured coating that, upon at least substantial curing, forms a cured residue of the composition. In one or more embodiments, these liquid flashing compositions have an appropriate viscosity to allow useful application methods such as brushing or rolling, while at the same time having sufficiently low viscosity to prevent deleterious sagging or running when applied to a vertical surface.

As those skilled in the art appreciate, these liquid flashing compositions can include one-part compositions that typically cure through a reaction with moisture (i.e. water) or by evaporation of a solvent or carrier. Additionally, these compositions may include two-part reactive compositions whereby a first reactant is supplied by a first part of the composition (e.g. an A-side stream) and a second reactant is supplied by a second component (e.g. a B-side stream). Upon mixing or contact, two parts form a reactive composition. These two-part compositions typically form cured residues upon reaction of the A and B side, optionally together with the removal of any solvent or carrier that may be present.

In one or more embodiments, the liquid flashing composition is a one-part polyurethane composition. As those skilled in the art appreciate, these compositions typically include isocyanate prepolymers that are crosslinked upon exposure to water (e.g. moisture within the air).

In one or more embodiments, the liquid flashing compositions include two-part polyurethane compositions that are formed by two distinct reactant streams. Namely, useful two-part polyurethane compositions include an A-side stream, which includes an isocyanate or isocyanate prepolymer, and a B-side stream, which includes an isocyanate-reactive component, such as a polyol. As is known in the art, these compositions can include various other additives, which are typically supplied together with the polyol within the B-side stream, such as catalysts, plasticizers, and extenders.

In one or more embodiments, the liquid flashing compositions include two-part acrylate resin compositions. For example, these compositions may include methyl methacrylate monomer compositions, which are typically supplied in a first stream. These monomers are polymerized, either alone or in combination with various comonomer, upon exposure or contact to a catalyst or initiator, which is typically supplied by a second reactant stream. In one or more embodiments, a free radical initiator, such as a peroxide, is supplied to the acrylate monomer, optionally together with comonomer, to produce polyalkylacrylate compositions such as polymethyl methacrylate cured compositions.

In one or more embodiments, the liquid flashing compositions include silicon adhesives, which may also be referred to as polysiloxane adhesives. Useful silicon-containing polymer adhesive systems also include polymer systems that include terminal siloxy or alkylsiloxy groups. As the skilled person appreciates, these polysiloxane adhesives can cure upon exposure to water (e.g. moisture within the air). These compositions may include various complementary constituents such as tackifier resins, moisture scavengers, and silane adhesion promoters. These adhesive systems are generally known in the art as disclosed in WO 2014/145482, WO 2014/095650, U.S. Pat. Nos. 7,019,074, 6,183,551, and U.S. Publ. No. 2007/0282080.

Liquid Flashing Fabric Reinforcement

As suggested above, the flashing assembly may include an optional flashing fabric (e.g. fabric 126), which is typically applied in conjunction with the liquid flashing composition. In practicing the present invention, conventional flashing fabrics may be employed. These include nonwoven polyolefin and nonwoven polyester fabrics.

Method of Installing Flashing

In one or more embodiments, the flashing assemblies of the present invention can be prepared by a method that includes providing a flashing composite as described herein, bonding the membrane component of the composite to a polymeric roofing membrane, and then applying a liquid flashing composition to the fabric component of the flashing composite and to a vertical surface of the structure being flashed.

In one or more embodiments, the step of bonding the polymeric component of the flashing composite to the polymeric roofing membrane first includes positioning the flashing composite onto the polymeric membrane of the roofing system at a location proximate to the vertical surface being flashed (i.e. positioning the composite to a achieve a membrane to membrane configuration). This may include positioning the entire polymeric membrane surface of the composite in contact with the polymeric membrane of the roofing system, or it may include only partially contacting the two respective polymeric membrane surfaces while, for example, extending a portion of the membrane surface of the flashing composite up the vertical surface.

Once the flashing laminate is positioned, the membrane surface of the flashing composite is mated to the polymeric membrane of the roofing system by employing one or more desirable techniques. The technique that is employed to mate the surfaces may be chosen based upon the nature of the polymeric membrane of the respective flashing composite and roofing system. For example, where the polymeric membrane of the roofing system is a thermoplastic membrane, and the membrane portion of the flashing composite is a thermoplastic, the respective membrane portions can be heat welded to each other. In alternate embodiments, the respective membrane portions can be bonded through the use of an adhesive, such as a liquid-based adhesive or a solid-state adhesive, such as a tape. In particular embodiments, the composite can carry a pre-applied tape or adhesive layer.

Once the membrane component of the flashing composite is bonded to the roofing system (i.e. bonded to a membrane panel), the liquid flashing composition is applied. Conventional techniques for applying liquid flashing compositions can be employed. For example, the liquid flashing composition can be applied by using brushing or rolling techniques. In other embodiments, especially where the liquid flashing composition has a higher viscosity, known tools such as knives and trowels can be employed. Also, the liquid flashing composition can be applied as one single layer or as multiple layers. Additionally, in combination with application of the liquid flashing composition, a fabric reinforcement can be applied. For example, a fabric reinforcement (e.g. fabric 126) can be applied adjacent to the vertical structure, and then the liquid flashing composition is applied over the fabric reinforcement. In other embodiments, a first layer of liquid flashing composition can be applied to the vertical surface of the vertical structural element, and then the fabric reinforcement can be applied to the first layer of liquid flashing material, and then another optional layer of liquid flashing material may be applied to cover the fabric reinforcement. In one or more embodiments, the fabric reinforcement can be applied to both the vertical surface and the horizontal (or a portion of the horizontal) surface such that the fabric reinforcement traverses the transition or corner between the vertical and horizontal surfaces. In any event, the skilled person will appreciate that the liquid flashing composition is applied to traverse the flashing composite and the vertical surface of the vertical structural element. As described above with reference to FIG. 2, application of the liquid flashing composition can extend from the membrane surface to the vertical surface being flashed, or it may only traverse a portion of the flashing composite.

Roof System

With reference again to FIG. 1, the other components of the roof system may be conventional in nature. For example, practice of this invention is not limited by the selection of any particular roof deck. Accordingly, the roofing systems of this invention can include a variety of roof decks. Exemplary roof decks include concrete pads, steel decks, wood beams, and foamed concrete decks.

Practice of this invention is likewise not limited by the selection of any water-protective layer or membrane. As is known in the art, several membranes can be employed to protect the roofing system from environmental exposure, particularly environmental moisture in the form of rain or snow. Useful protective membranes include polymeric membranes. Useful polymeric membranes include both thermoplastic and thermoset materials. For example, and as is known in the art, membrane prepared from poly(ethylene-co-propylene-co-diene) terpolymer rubber or poly(ethylene-co-propylene) copolymer rubber can be used. Roofing membranes made from these materials are well known in the art as described in U.S. Pat. Nos. 6,632,509, 6,615,892, 5,700,538, 5,703,154, 5,804,661, 5,854,327, 5,093,206, and 5,468,550, which are incorporated herein by reference. Other useful polymeric membranes include those made from various thermoplastic polymers or polymer composites. For example, thermoplastic olefin (i.e. TPO), thermoplastic vulcanizate (i.e. TPV), or polyvinylchloride (PVC) materials can be used. The use of these materials for roofing membranes is known in the art as described in U.S. Pat. Nos. 6,502,360, 6,743,864, 6,543,199, 5,725,711, 5,516,829, 5,512,118, and 5,486,249, which are incorporated herein by reference. In one or more embodiments, the membranes include those defined by ASTM D4637-03 and/or ASTM D6878-03.

Other layers or elements of the roofing systems are not excluded by the practice of this invention. For example, and as is known in the art, another layer of material can be applied on top of the protective membrane. Often these materials are applied to protect the protective membranes from exposure to electromagnetic radiation, particularly that radiation in the form of UV light. In certain instances, ballast material is applied over the protective membrane. In many instances, this ballast material simply includes aggregate in the form of rock, stone, or gravel; U.S. Pat. No. 6,487,830, is incorporated herein in this regard.

The construction boards of this invention can be secured to a building structure by using various known techniques. For example, in one or more embodiments, the construction boards can be mechanically fastened to the building structure (e.g. the roof deck). In other embodiments, the construction boards can be adhesively secured to the building structure.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publ. Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference.

As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood.

In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510, which are incorporated herein by reference. In other embodiments, the cover boards may include construction boards such as DensDeck.

Various modifications and alterations that do not depart from the scope and spirit of this invention will become apparent to those skilled in the art. This invention is not to be duly limited to the illustrative embodiments set forth herein.

What is claimed is:

1. A roofing system comprising:
 (i) a roof deck;
 (ii) a vertical structure extending from said roof deck;
 (iii) a membrane system covering said roof deck, said membrane system including a polymeric membrane; and
 (iv) a flashing assembly creating a water-proof seal between said membrane system and said vertical structure, where said flashing assembly includes a flashing composite having a generally planar polymeric membrane component having first and second planar surfaces, and a fabric component attached to said first planar surface of said membrane component, said second planar surface of said polymeric membrane component being bonded to said polymeric membrane of said membrane system such that the bond between the second planar surface of the polymeric membrane component and said polymeric membrane of said membrane system is opposite said fabric, and said flashing assembly further including a cured residue layer of a liquid flashing composition forming an outermost layer of the flashing assembly and extending from said fabric component of said flashing composite to a surface of said vertical structure, and said cured residue being embedded within and bonded to said fabric component and bonded to said surface of said vertical structure.

2. The roofing system of claim 1, where said membrane system and said membrane component of said flashing composite are thermoplastics, and where said membrane component of said fleeced flashing membrane is thermally bonded to said membrane system.

3. The roofing system of claim 1, where said membrane system is a thermoset rubber, where said membrane component of said flashing composite is a thermoset rubber, and where said membrane component of said flashing composite is bonded to said membrane system through an adhesive.

4. The roofing system of claim 1, where said cured residue layer of a liquid flashing composition is the cured residue of a one-part polyurethane composition.

5. The roofing system of claim 1, where said cured residue layer of a liquid flashing composition is the cured residue of a two-part polyurethane composition.

6. The roofing system of claim 1, where said cured residue layer of a liquid flashing composition is a polymethyl methacrylate.

7. The roofing system of claim 1, further comprising a fabric reinforcement within said cured residue layer.

8. The roofing system of claim 1, where said fabric is a fleece.

9. The roofing system of claim 1, where said residue of a liquid flashing composition is a silicon-container polymer.

10. The roofing system of claim 1, where said fabric has a generally planar configuration with oppositely facing first and second planar surfaces, where said first planar surface of said fabric is bonded to said membrane component, and where the residue of said liquid flashing completely covers the second planar surface of said fabric.

11. The roofing system of claim 1, where said roof deck and said vertical structure form an intersection where said roof deck and said vertical structure meet, and where said flashing composite, which is bonded to said membrane system, terminates at or prior to said intersection.

* * * * *